(12) United States Patent
Kartoun et al.

(10) Patent No.: US 11,257,501 B2
(45) Date of Patent: Feb. 22, 2022

(54) IDENTITY VERIFICATION SYSTEM USING VOICE RECOGNITION BY AN INDIVIDUAL

(71) Applicant: International Business Machines Corporation, Armonk, NY (US)

(72) Inventors: Uri Kartoun, Cambridge, MA (US); Fang Lu, Billerica, MA (US); Yoonyoung Park, Cambridge, MA (US); Kenney Ng, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 16/397,563

(22) Filed: Apr. 29, 2019

(65) Prior Publication Data
US 2020/0342877 A1    Oct. 29, 2020

(51) Int. Cl.
| | |
|---|---|
| G10L 17/00 | (2013.01) |
| G06F 21/32 | (2013.01) |
| G10L 17/22 | (2013.01) |
| G10L 17/26 | (2013.01) |

(52) U.S. Cl.
CPC ............ *G10L 17/00* (2013.01); *G06F 21/32* (2013.01); *G10L 17/22* (2013.01); *G10L 17/26* (2013.01)

(58) Field of Classification Search
CPC ......... G10L 17/00; G10L 17/26; G10L 17/22; G06F 21/32
See application file for complete search history.

(56) References Cited

U.S. PATENT DOCUMENTS

| | | | |
|---|---|---|---|
| 6,324,271 B1 | 11/2001 | Sawyer et al. | |
| 9,282,096 B2 | 3/2016 | Goldstein et al. | |
| 10,089,809 B1 | 10/2018 | Daly et al. | |
| 2008/0235108 A1 | 9/2008 | Kulakowski et al. | |

(Continued)

FOREIGN PATENT DOCUMENTS

| | | |
|---|---|---|
| GB | 2471612 B | 7/2012 |
| WO | 2012142045 A2 | 10/2012 |

OTHER PUBLICATIONS

Eisenberg, Anne. "What's Next; Is That You, Son? Voice Authentication Trips Up the Experts." The New York Times Nov. 13, 2003. Retrieved from the Internet: https://www.nytimes.com/2003/11/13/technology/what-s-next-is-that-you-son-voice-authentication-trips-up-the-experts.html [retrieved on Oct. 17, 2018].

*Primary Examiner* — Thomas H Maung
(74) *Attorney, Agent, or Firm* — Troutman Pepper Hamilton Sanders LLP

(57) ABSTRACT

A verification device is configurable for verifying the identity of a person. The verification device may be in communication with a user device and an entity device that may request an authorization decision from the verification device. The verification device may have a collection system configured to populate a voice profile database with a plurality of voice profiles in the form of audio recordings of people. The verification device may also have a testing system configured to select one of the voice profiles, provide the voice profile to an end-user device, and receive an answer from the end-user device, the answer being an attempt by the person to identify an individual associated with the voice profile. The verification device may further have an authentication system configured to determine whether the identity of the person is verified based on the answer from the end-user device.

20 Claims, 8 Drawing Sheets

(56) References Cited

U.S. PATENT DOCUMENTS

| | | | |
|---|---|---|---|
| 2014/0236598 A1* | 8/2014 | Fructuoso | G10L 13/033 704/249 |
| 2015/0067808 A1 | 3/2015 | Varghese | |
| 2015/0189028 A1* | 7/2015 | Sayed | H04W 4/021 709/204 |
| 2016/0155188 A1* | 6/2016 | Ramakrishna | G06Q 40/02 705/75 |
| 2018/0233152 A1* | 8/2018 | Olaya | G10L 15/22 |

\* cited by examiner

IDENTITY VERIFICATION SYSTEM USING VOICE RECOGNITION BY AN INDIVIDUAL

TECHNICAL FIELD

The present application relates to systems and method for identity verification and, more particularly, to systems and methods using voice recognition by an individual to verify the identity of the individual.

BACKGROUND

In order to prevent fraud and provide security to various activities, we rely on identification methods to verify that people are who they claim they are. For example, a variety of authentication methods are available to identify a patient when he or she arrives at a physician's office; the patient may be asked to present a valid identify identification (ID) and specify his or her date of birth. In other scenarios when a patient wishes to log in to an on-line patient portal, he or she may be requested to type a textual password by using a user interface or text messaging technology incorporated into a mobile device. Additional identity verification methods include, for example, face recognition, fingerprint identification, hand geometry biometrics, retina scan, iris scan, image processing of a signature, and voice analysis. While these verification tools are useful, they are susceptible to certain types of fraud. Moreover, although the use of multiple authentication methods becomes more prevalent (often called "two-factor authentication"), new novel methods for verifying an individual are useful and needed. The present disclosure describes an additional method for verifying the identity of an individual.

SUMMARY

In some embodiments, a computer implemented method for verifying the identity of a person through a verification device comprising a processing device and a memory comprising instructions which are executed by the processor is disclosed. The method includes receiving identifying information related to the identity of the person, recalling a voice profile from a voice profile database, the voice profile being an audio recording of another person, providing the voice profile to an end-user device, receiving an answer from the end-user device, the answer being an attempt by the person to identify the identity of the another person, and determining whether the identity of the person is verified based on the answer from the end-user device.

In other embodiments, a verification device is disclosed. The verification device includes a collection system configured to populate a voice profile database with a plurality of voice profiles associated with individuals known to the person, the voice profiles being audio recordings of the voices of the individuals known to the person. The verification device also includes a testing system configured to select one of the voice profiles from the voice profile database, provide the voice profile to an end-user device, and receive an answer from the end-user device, the answer being an attempt by the person to identify an individual associated with the voice profile. The verification device also includes an authentication system configured to determine whether the identity of the person is verified based on the answer from the end-user device.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
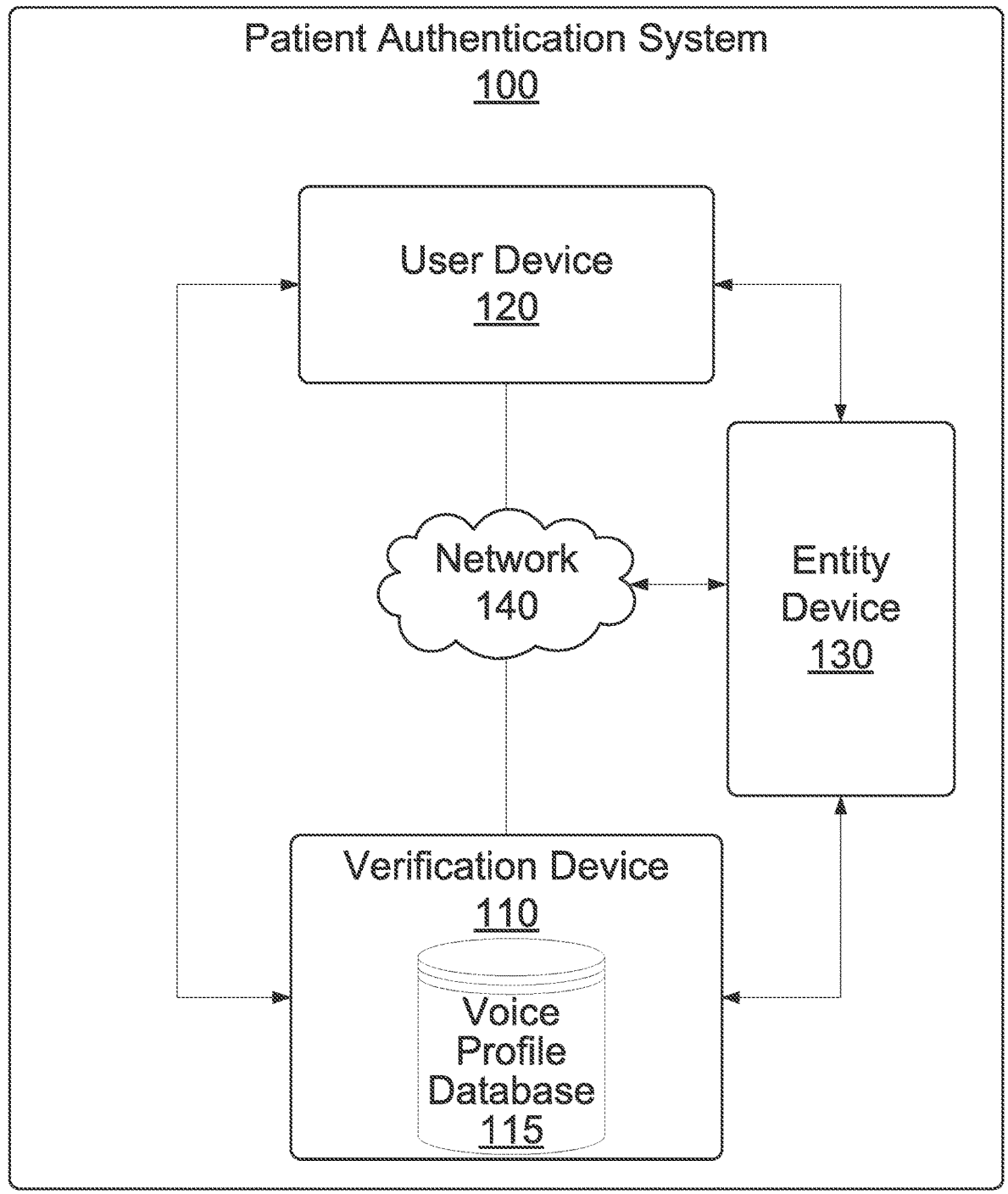
FIG. 1 is a block diagram of an example patient authentication system, according to an embodiment.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The present disclosure relates to identity verification of a person. In one example, when a patient arrives to a physician's office for an annual examination, a user (e.g., office employee) asks the patient to present his or her ID (such as a state-issued ID card or a passport) and further may provide the identifying information to a verification system. The patient is then asked to identify the identity of one or more people in audio recording(s) that are played by an output device. One example may be: "Hello son, how are you?." The patient can immediately identify that the recording voice is his father's, and reply to the receptionist "This is my father, David." The patient's ability to identify his father's voice provides an increased confidence in the patient's real identity as presented in the ID.

In another disclosed example, someone attempts to receive health services in a certain facility using a stolen ID. When that person arrives at the hospital, upon typing the patient's identity details, the physician's computer will also play several audio recordings of voice profiles of one of the patient's contacts (e.g., patient's mother or one of his friends). The person will be required to type or tell the user the name of that person which is associated with the corresponding voice profile. If the person cannot identify the people in the recordings, it can be determined that the person's identity, as presented, cannot be authenticated or verified. This process expects to achieve an increased confidence in the real patient's identity and raise alerts in case a false patient attempts using a stolen identity.

The disclosed embodiments provide systems and methods to populate a voice profile database and use the voice profile database to perform a verification process. The voice profile database may include voice profiles in the form of audio recordings of individuals. The voice profiles may be interconnected based on known relationships between people such that linkages may be used to determine which voice profiles to select to test a person's knowledge of the identity of the people in the recordings. The audio recordings may be short clips (e.g., 2-second) and may include general statements or specifically-tailored messages. A verification device may provide the voice profiles to an end-user device (e.g., a user device or entity device) and receive answers as attempts to identify the people in the voice profiles. The verification device may then issue an authentication decision that determines whether the person's identity is verified through the process.

FIG. 1 is an illustration of an exemplary patient authentication system 100. The patient authentication system 100 may include a verification device 110 having a voice profile database 115, a user device 120, and an entity device 130. A network 140 may connect the verification device 110, the user device 120, and/or the entity device 130.

The verification device 110 may be a computing device. The verification device 110 may include components that enable disclosed functions for verifying an individual's identity. The verification device 110 may include a processing device and a memory, for example. The verification device 110 is configured to execute instructions stored in the memory through the processing device to perform a verification process. The voice profile database 115 may store a plurality of user profiles and voice profiles associated with the user profiles. The voice profiles may include audio recordings of the individual. The user profiles may include additional information identifying the individual and connecting the individual to other people. The user profiles may be connected through linkages that indicate a relationship to another person. The linkages may be grouped according to one or more factors.

The user device 120 and entity device 130 may be an end-user computing device (e.g., a desktop or laptop computer, mobile device, etc.). The user device 120 may be, for example, a mobile device associated with an individual. The entity device 130 may be, for example, a computer associated with a physician's office. The user device 120 and entity device 130 may communicate with the verification device 110 in relation to, for example, a verification process using voice profiles. The user device 120 and entity device 130 may include input/output devices such as speakers, microphones, display screens, keyboards, etc. that enable an individual to provide a voice profile, hear a recorded voice profile, provide an answer to a voice profile, and view information related to the voice profile (e.g., question prompts or answer choices).

The network 140 may be a local or global network and may include wired and/or wireless components and functionality which enable internal and/or external communication for components of the healthcare data environment. The network 140 may be embodied by the Internet, provided at least in part via cloud services, and/or may include one or more communication devices or systems which enable data transfer to and from the systems and components of the patient authentication system 100.

In accordance with some exemplary embodiments, the verification device 110, user device 120, entity device 130, or the related components include logic implemented in specialized hardware, software executed on hardware, or any combination of specialized hardware and software executed on hardware, for implementing the patient authentication system 100 or related components. In some exemplary embodiments, the verification device 110 or any of its components may be or include the IBM Watson™ system available from International Business Machines Corporation of Armonk, N.Y., which is augmented with the mechanisms of the illustrative embodiments described hereafter.

Figure 2:
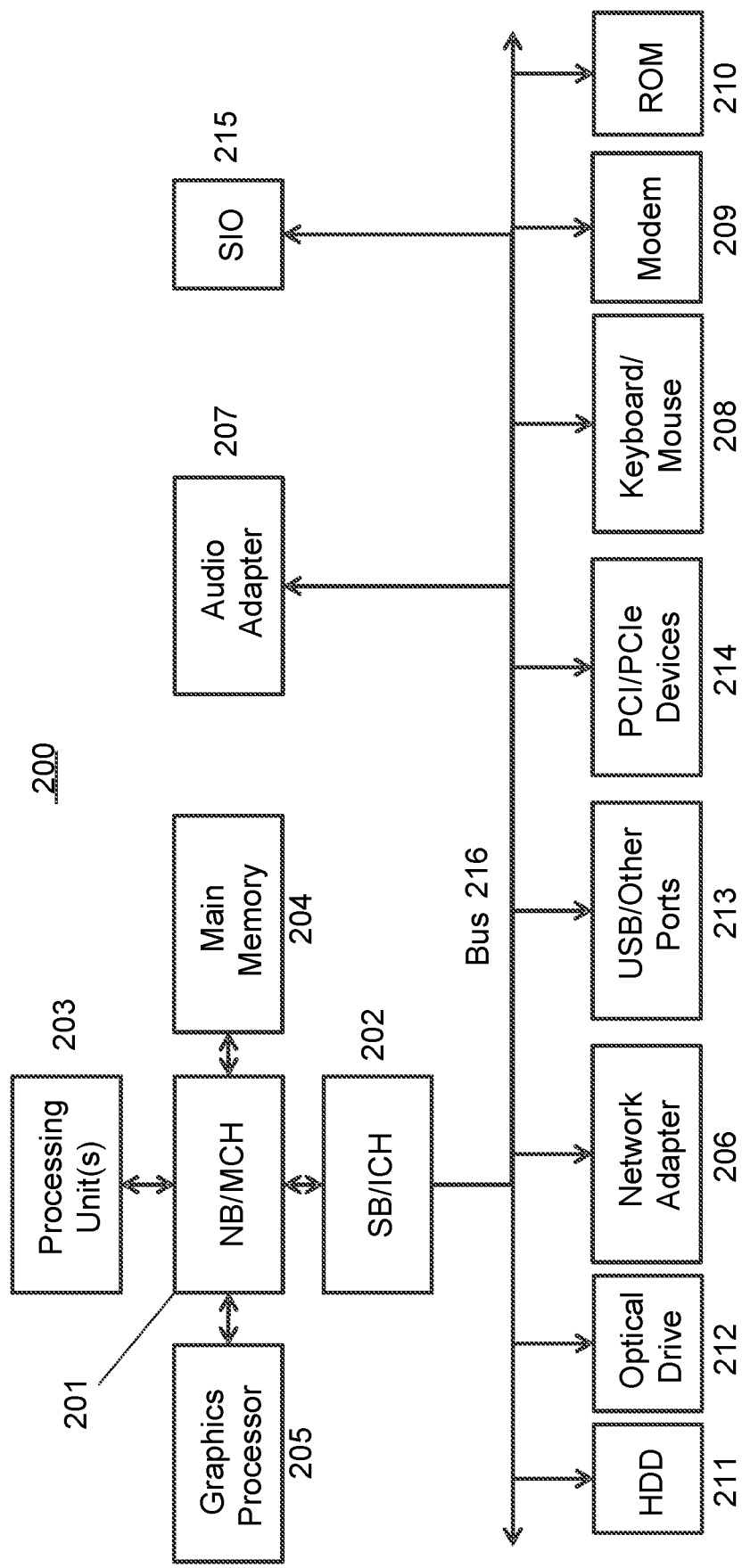
FIG. 2 is a block diagram of an example data processing system in which aspects of the illustrative embodiments are implemented.

FIG. 2 is a block diagram of an example data processing system 200 in which aspects of the illustrative embodiments may be implemented. Data processing system 200 is an example of a computer in which computer usable code or instructions implementing the process for illustrative embodiments of the present invention are located. In one embodiment, the data processing system 200 represents one or more of the verification device 110, the user device 120, or the entity device 130, and implements at least some of the functional aspects described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System p running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the website navigation system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. For example, the data processing system 200 includes several components which would not be directly included in some embodiments of the patient authentication system 110, user device 120, or entity device 130.

Moreover, other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
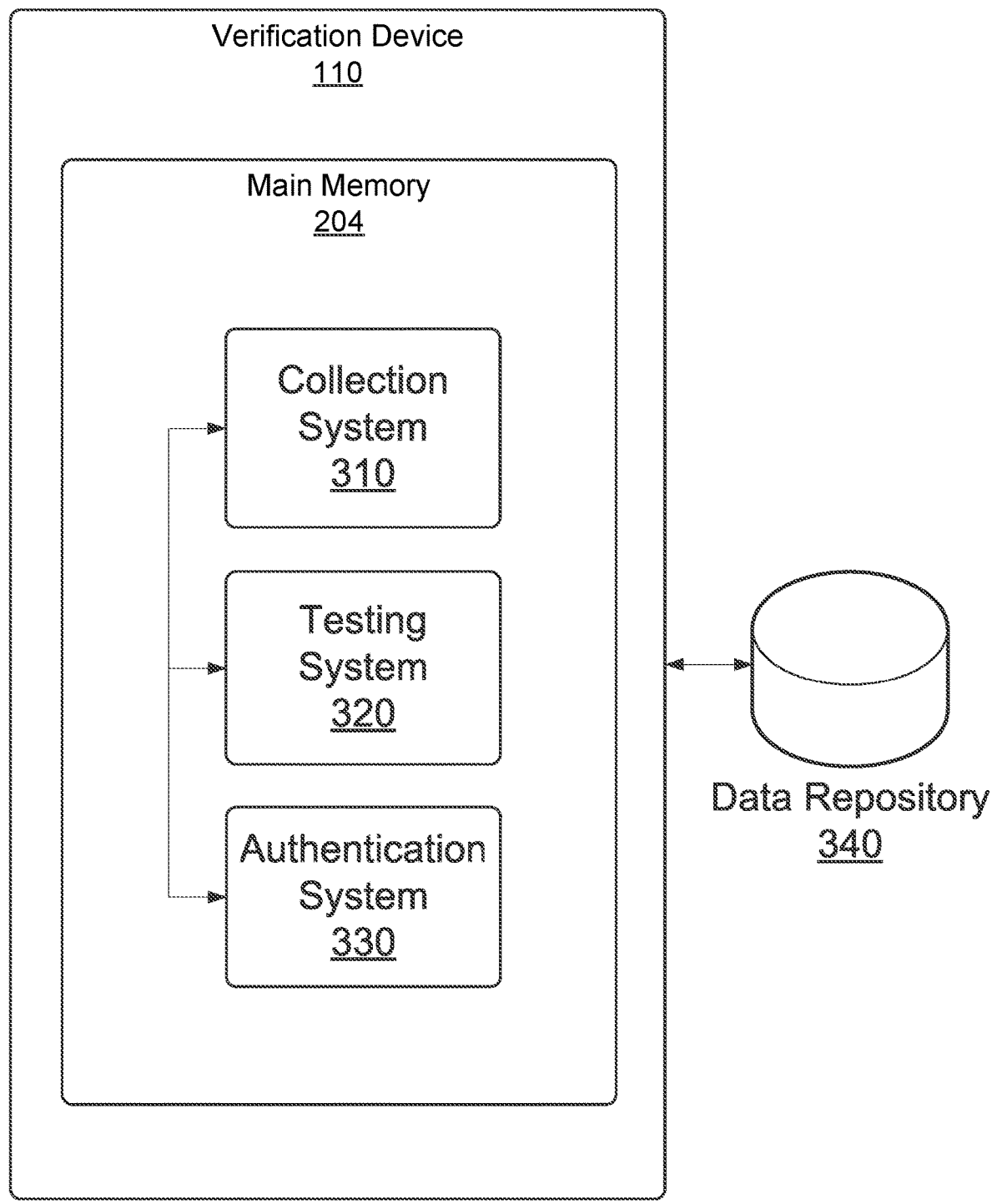
FIG. 3 is a block diagram of an example verification device, according to an embodiment.

FIG. 3 illustrates an exemplary embodiment of the verification device 110. In an exemplary embodiment, the verification device 110 includes a collection system 310, a testing system 320, and an authentication system 330. These subsystems of the verification device 110 may be components of a single device, or may be separated devices connected to each other (e.g., via the network 140). In some embodiments, the verification device 110 may further include and/or be connected to a data repository 340.

The collection system 310 may be a computing device or component (e.g., software or hardware engine or module) configured to populate the voice profile database 115. For example, the collection system 310 may be configured to create user profiles for individuals, such as person A, B, C, D, and E. The collection system 310 may further store voice profiles in one or more of the user profiles, the voice profile being an audio recording of the person. The collection system 310 may also gather identifying information for connecting the user profiles, creating prompts for voice profiles, and determining answers to the prompts.

The testing system 320 may be a computing device or component (e.g., software or hardware engine or module) configured to select a voice profile, determine a prompt associated with the voice profile, and receive an answer to the prompt. For example, the testing system 320 may recall a voice profile connected to a person for whom verification is sought (e.g., the person's father). The testing system 320 may further generate a prompt, such as "what is this person's name" or "who is this person in relation to you?" The testing system 320 may further provide answer choices to the prompt in some embodiments.

The authentication system 330 may be a computing device or component (e.g., software or hardware engine or module) configured to determine whether an individual's identity is verified on the basis of received answers to voice profile prompts. For instance, the authentication system 330 may compare received answers to stored information to determine whether the individual recognizes the voice in a provided voice profile. If the person recognizes the voice, the person's identity can be considered verified to a certain degree of security. The authentication system 330 may follow pre-established security protocol to determine whether the answers are sufficient to verify the individual.

The data repository 340 may be a database configured to store data. The data repository 340 may be configured to receive data from the verification device 110, user device 120, and/or entity device 130 and store the data according to appropriate storage protocols. In some embodiments, the data repository 340 may be the voice profile database 115.

Figure 4:
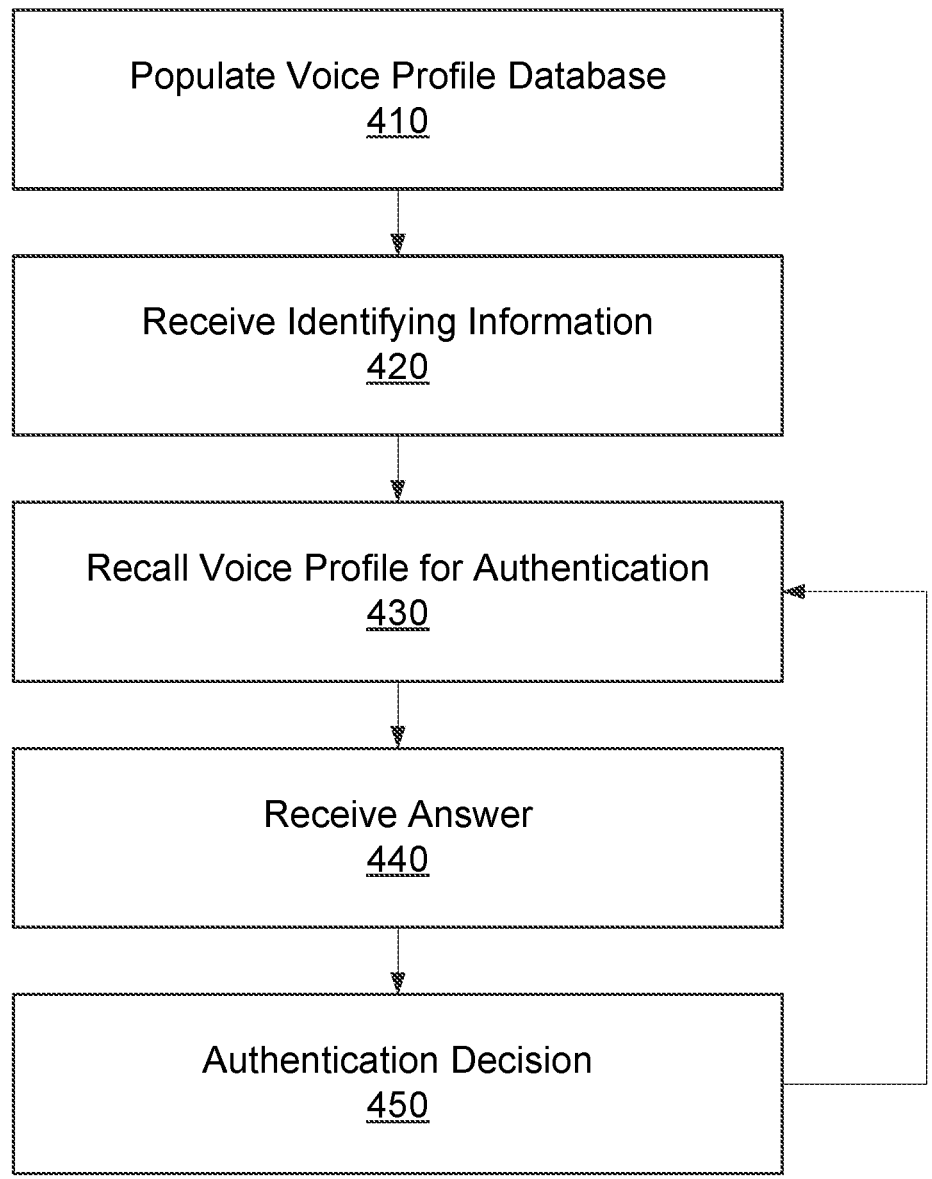
FIG. 4 is a flowchart of an example verification process using voice recognition by an individual, according to an embodiment.

FIG. 4 is a flowchart of an exemplary patient authentication process 400. The verification device 110 may perform one or more steps of the process 400 in order to verify a patient. For instance, process 400 may occur at least in part as a result of a patient attending an appointment with a physician and the need to verify the identity of the patient. The patient may, in some instances, provide documentation (e.g., government ID) as part of an authentication protocol. The process 400 may be used to supplement and/or replace a normal verification process for authenticating a patient's identity. Moreover, while the process 400 is described in relation to a patient-physician setting, it should be understood that the disclosed embodiments are not so limited.

In step 410, the verification device 110 populates the voice profile database 115. For instance, the collection system 310 may obtain voice recordings of individual voices and store them in the voice profile database 115. The collection system 310 may further establish linkages between the constituents of the voice profile database 115. For example, each voice profile in the database 115 may include an identifier of the person's voice together with tags and linkages that connect that person to other people that may be considered to recognize the person's voice.

In step 420, the verification device 110 receives a verification request. For example, the testing system 320 may receive a request to initiate a verification of an individual. This may occur, for example, after a patient arrives at a physician's office and the office attempts to verify the identity of the individual. A user may operate the entity device 130 to send a request to the verification device 110, which may be received by the testing system 320. The request may include identifying information for the patient, such as the patient's name, date of birth, social security number, or the like.

In step 430, the verification device 110 recalls a voice profile for authentication. For example, the testing system 320 may identify a profile for the patient based on the identifying information received with the request and select a voice profile associated with the individual. The testing system 320 may provide the recalled voice profile to the entity device 130 for being played to the individual (e.g., through a speaker, headset, etc.) for the individual to identify the voice in the voice profile. In some embodiments, the testing system 320 may provide a plurality of answer options together with the voice profile for providing to the individual as options for response.

In step 440, the verification device 110 receives an answer to the voice profile test. For example, the authentication system 330 receives information indicating a response from the individual's attempt to identify the voice in the voice profile. For example, the individual may provide a response that is entered as text into the entity device 130. In another example, the individual may speak the answer into a microphone that is read through voice recognition software or converted manually into a textual response. In yet another example, the individual may select from a plurality of answer options.

In step 450, the verification device 110 evaluates the received answer and provides an authentication decision. For example, the authentication system 330 may compare the received answer to secure tags stored in relation to the provided voice profile to determine whether the individual provided a correct response or incorrect response. The verification device 110 may further provide the authentication decision to the entity device 130. For example, the authentication system 330 may provide a decision indicating that the individual provided a correct response, an incorrect response, or simply that the individual is verified or not verified. In some embodiments, multiple voice profiles may be tested with the individual for additional security, such as by repeating steps 430-450.

In another embodiment, the voice profiles are grouped according to the level of ease of identification. For example, a first group may include voice profiles of the close family members of the individual (e.g., father, mother, brother(s), sister(s)). A second group may include voice profiles of close friends of the individual. A third group may include voice profiles of colleagues of the individual (such as employees at the individual's employer or students the individual is familiar with). A fourth group may include voice profiles of service personnel that individual may interact with (e.g., barber, gym trainer). A fifth group may even include voice profiles of pets (e.g., the individual's dog's voice, or the individual's girlfriend's cat's voice). More than one voice profile may be played at the time of the authentication attempt. The individual may be presented, for example, with a voice profile of his or her sister, followed by a voice profile of a friend, followed by a voice profile of a colleague. The individual will be authenticated only if he or she was able to identify correctly the three voices. It should be noted that voice profiles may not necessarily be presented to the individual in any particular order; they may even presented randomly, or in any order also presenting more than one voice profile from the same group. Selecting the order of the voice profiles, types of groups, and the number of voice profiles presented to the individual is fully configurable. A subsequent voice profile presented to the individual may also depend on whether the user fails or succeeds in identifying a voice profile.

Figure 5:
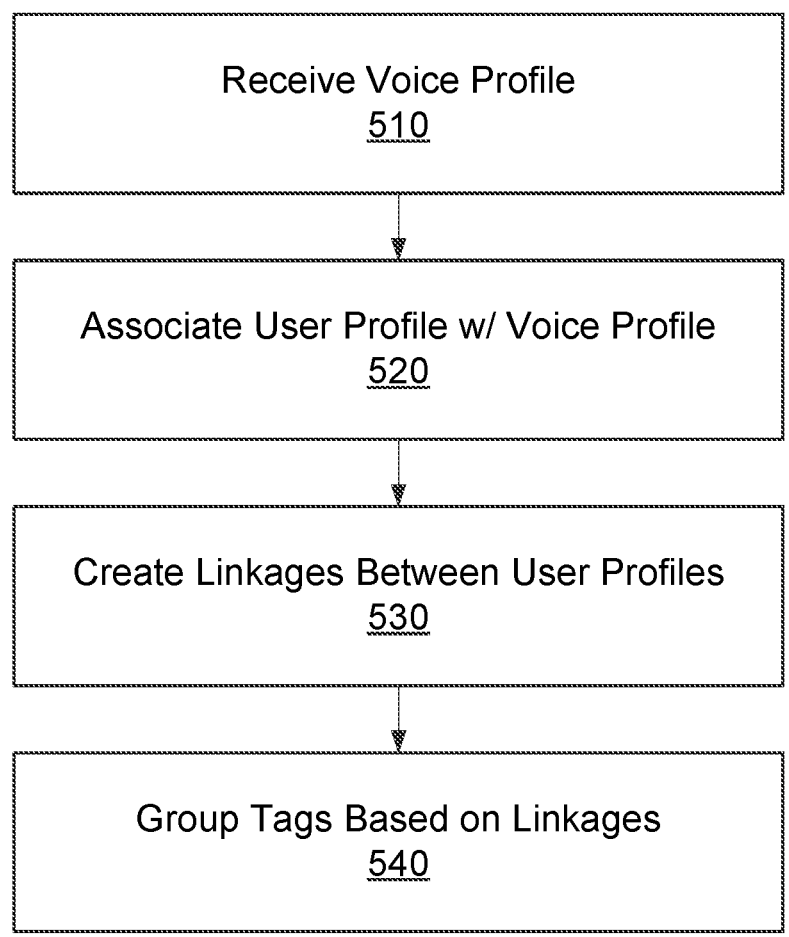
FIG. 5 is a flowchart of an example process for populating a voice profile database, according to an embodiment.

FIG. 5 is a flowchart of a first exemplary process 500 for populating the voice profile database 115. The verification device 110 may perform one or more steps of the process 500 to establish the needed voice profiles and accompanying information to reliably verify individual identities through their recognition of voices in the profiles. The verification device 110 may communicate with the user device 120 and/or entity device 130 to receive recordings and/or associated information.

In step 510, the verification device 110 receives a voice profile and associated information. For example, the collection system 310 may receive an audio file with a recording of an individual's voice, together with information identifying the individual as well as people associated with the individual. For example, the collection system 310 may collect an audio recording of person A, the name of person A, and the names of person A's immediate family members, friends, and/or acquaintances and their relationship to person A (e.g., person B is person A's mother, person C is person A's father, person D is person A's friend, person E is person A's co-worker). Step 510 may include the receipt of multiple voice profiles and associated information (e.g., voice profiles for persons B, C, D, and E).

The verification device 110 may receive a voice profile through a variety of methods. For instance, a request may be sent to a mobile device 120 associated with the individual with instructions for providing an audio recording and accompanying information. In another example, when a patient arrives at a physician's office, a user may determine that the patient has not yet recorded a voice profile and may do so using the entity device 130. The content of the voice recording can be selected according to desired parameters for levels of security. For example, the voice recording may be a generic statement, or may be specific to the individual (e.g., provides a fact about the person).

In step 520, the verification device 110 creates and associates secure tags with the received voice profile. For example, the collection system 310 may create a user profile for person A, including the audio recording of their voice and individual tags for each associated individual. The secure tags may be stored in the profile and used to generate correct answers when that particular voice profile is provided for a verification. For instance, the profile of person A may store a secure tag of (person C—father). Step 520 may be repeated for each received voice profile. For example, the profile of person C may store the audio recording of person C speaking and a secure tag of (person A—son).

In step 530, the verification device 110 creates linkages between the secure tags and/or user profiles. For example, the collection system 310 may look for user profiles having tags that correspond to each other. In one example, the collection system 310 may identify person A and person C as including secure tags that respectively identify each other as father and son. The collection system 310 may create a linkage between these secure tags. In this way, voice profile associated with person A can be used to verify person C and vice versa. The identifiers in the secure tags can be used create answers when a voice profile is recalled for verification. For example, a correct answer when person A is provided with person C's voice profile could be stored as "father" or "dad" based on the father-son linkage between the secure tags. Similar answers, such as "mother," "sister," "friend," "co-worker," etc. can be stored based on other linkages. While the relationship to the person may be the part of an answer, in some embodiments, a person's name can be stored as a correct answer and the relationship linkage is used only to establish the pool of voice profiles that are acceptable to verify a particular individual. As step 530 is repeated and more linkages are created, the voice profile database 115 becomes populated with a "tree" of interconnected user profiles that enable the stored voice profiles to be used for identity verification.

In step 540, the verification device 110 groups the linkages from each user profile. For example, the collection system 310 may group the linkages that extend from the user profile of person A into groups such as "family," "friends," and "co-workers." The groups can be utilized when choosing a voice profile to recall for a verification request. In one embodiment, for example, the person may only be verified after correctly providing the name of an individual in each group.

Figure 6:
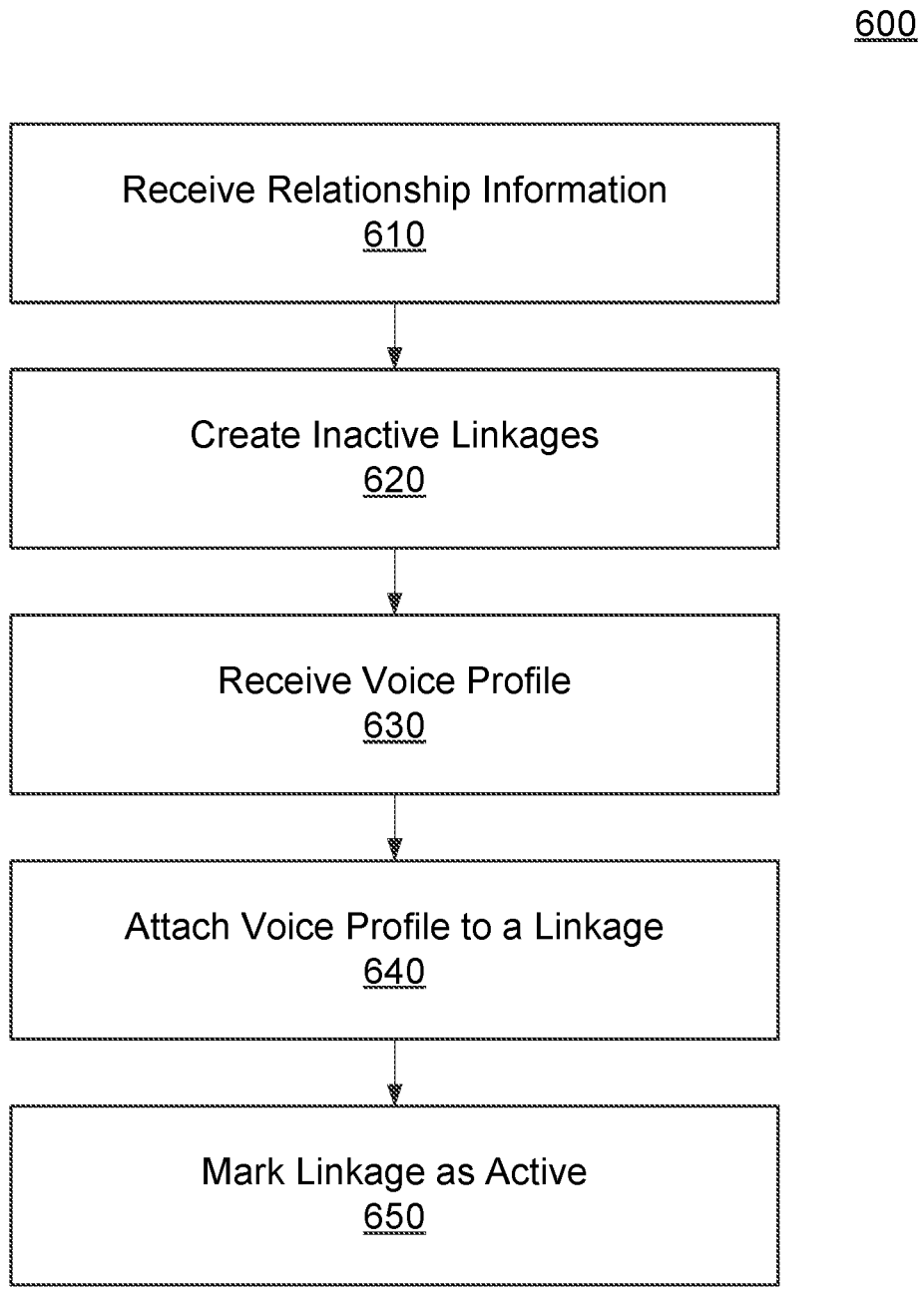
FIG. 6 is a flowchart of another example process for populating a voice profile database, according to an embodiment.

FIG. 6 is a flowchart of another exemplary process 600 for populating the voice profile database 115. Where process 500 populates the database upon receipt of a voice profiles, the process 600 may be considered an additional or alternative process that populates the database based on receipt of user information. For instance, a user profile may be created before a voice profile is received.

In step 610, the verification device 110 receives identifying information. For example, the collection system 310 may receive identifying data related to a person, such as name, date of birth, social security number, etc. The collection system 310 may create a user profile based on the identifying information. The collection system 310 may create secure tags stored in the user profile to associate with other user profiles.

In step 620, the verification device 110 creates inactive linkages between the user profile created in step 610 and another user profile. For example, a linkage may be created between two family member user profiles. The linkage may be marked as inactive because a voice profile is not yet a part of the user profile. In some embodiments, the linkage may be active in one direction and inactive in another direction. For example, the linkage may be active for a daughter to recognize a voice profile from their mother but not vice versa. This may be based on the mother having already provided a voice profile but the daughter not having yet done so.

In step 630, the verification device 110 receives a voice profile. As described in relation to step 510 of process 500, the collection system 310 may receive a voice profile from a user device 120 and/or an entity device 130. The voice profile may include identifying information associated with the individual in the voice profile. In some embodiments, the verification device 110 may deliver a request for creation of a voice profile (e.g., send an email, text message, etc.) after creation of a user profile.

In step 640, the verification device 110 attaches the received voice profile to an already-created user profile. For example, the collection system 310 may store a voice profile in the voice profile database 115. For instance, in the mother-daughter example above, when the daughter provides a voice profile, it may be attached to the daughter's user profile in the voice profile database 115.

In step 650, the verification device 110 marks linkages as active based on receipt of a voice profile. For example, the collection system 310 may determine which linkages are affected by receipt of a voice profile and mark them as active, indicating that they are usable in a verification request. In one example, if a voice profile for person C is received and stored in the user profile for person C, a linkage to person A may be marked as active, indicating that person A may be verified using the voice profile for person C.

In some embodiments, the verification device 110 may populate the voice profile database 115 through a combination of processes 500 and 600. For instance, person A may provide a voice profile and information about family members, friends, and/or acquaintances. User profiles may be created for each of the individuals, including the user profile for person A with a voice profile. A request may then be sent to the other individuals for providing a voice profile, which may be stored in their respective user profiles with linkages being marked as active as the voice profiles are received. Active linkages may be grouped for formulating verification strategies according to desired levels of security.

Figure 7:
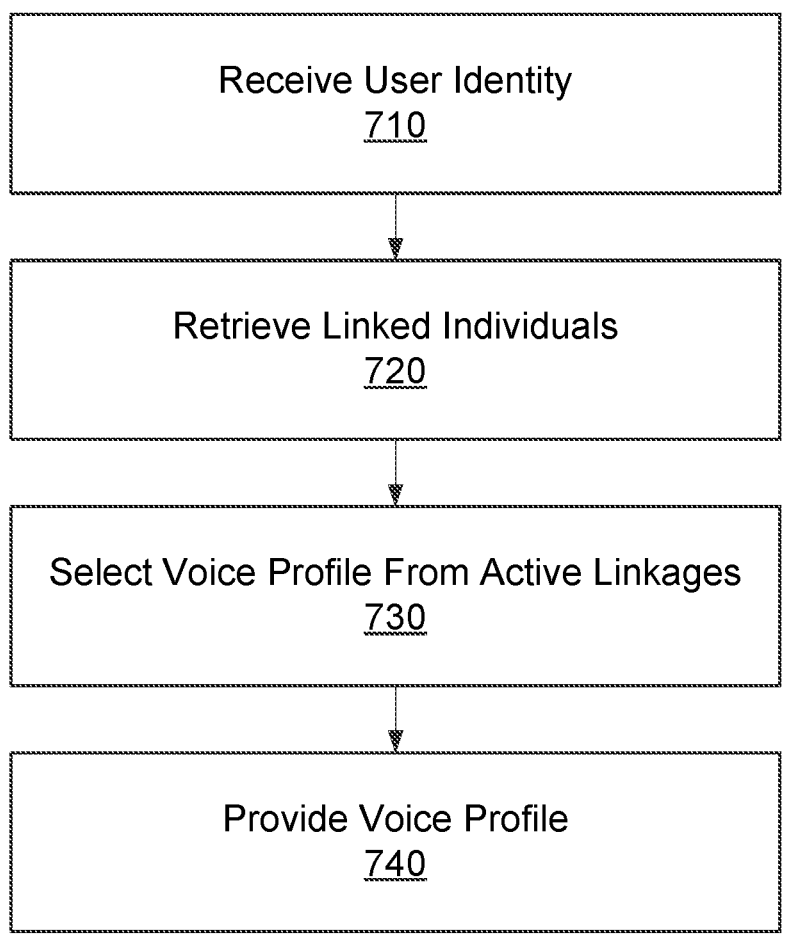
FIG. 7 is a flowchart of an example process for providing a voice profile during a verification process, according to an embodiment.

FIG. 7 is a flowchart of an exemplary process 700 for recalling a voice profile for authentication. Verification device 110 may perform one or more steps of the process 700 to provide a voice profile to an entity device 130 (or user device 120) for use in a verification process. In some aspects, the process 700 may correspond to step 430 of the process 400.

In step 710, the verification device 110 receives a user identity. For example, the testing system 320 may receive information identifying person A, such as name, date of birth, social security number, etc. The testing system 320 may search the voice profile database 115 for a user profile for person A.

In step 720, the verification device 110 retrieves linked individuals. For example, the testing system 320 may find all active linkages connected to the relevant user profile. For instance, the testing system 320 may identify linkages for person B, C, D, and E.

In step 730, the verification device 110 selects a voice profile associated with an active linkage. For example, the testing system 320 may select a voice profile associated with person C for verifying person A. The selection process may be based on pre-established security protocol and reliability standards. For instance, in some verification scenarios, a linkage associated with a co-worker may be more secure than a linkage associated with a parent or sibling. The testing system 320 may determine which voice profile to select based on the pre-established settings. In another example, a voice profile may be manually selected by a user.

In step 740, the verification device 110 provides the selected voice profile. For example, the testing system 320 may provide the voice profile to an entity device 130 for being audibly played for the individual being verified to hear. This may include the testing system 320 delivering an audio recording to the entity device 130. In some embodiments, the audio recording may be delivered to the user device 120, such as through a pre-recorded phone call. Exemplary process 700 provides a mechanism through which a verification request and test can be practically applied. As a result of hearing a voice profile, an individual can be prompted to provide an identifying answer, such as the person's name, their relationship to the person, or some other identifying information, depending on the desired level of security.

Figure 8:
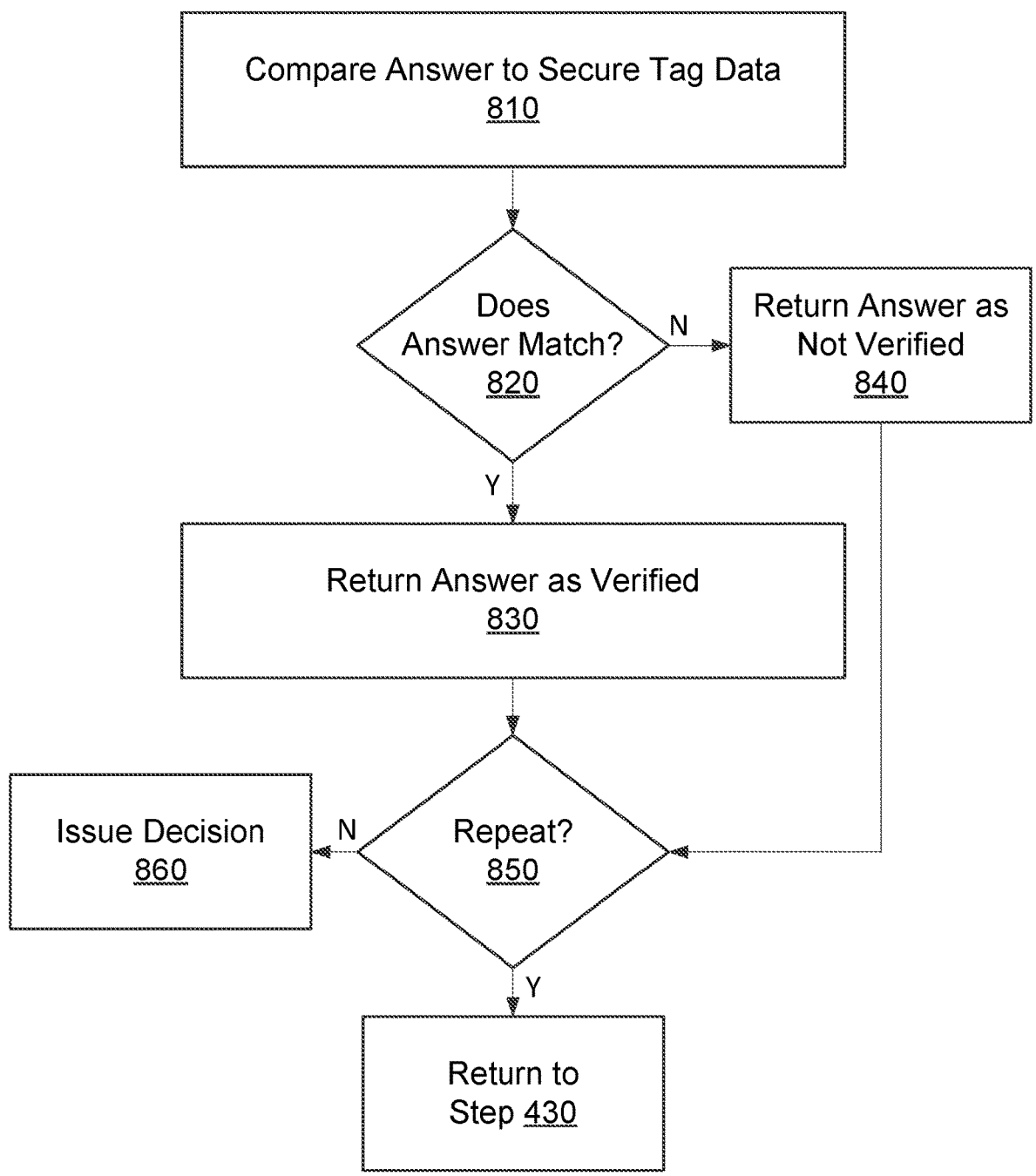
FIG. 8 is a flowchart of an example process for determining an authentication decision, according to an embodiment.

FIG. 8 is a flowchart of an exemplary process 800 for authenticating an individual. Verification device 110 may perform one or more steps of the process 700 to determine whether a person's identity is considered verified on the basis of answers provided to provided voice profiles. In some aspects, the process 800 may correspond to step 450 of the process 400.

In step 810, the verification device 110 compares the answer received in step 440 of process 400 to secure data tags. For example, the authentication system 330 may analyze input for use in comparing to stored secure tag information. In step 820, the verification device 110 determines whether the provided answer matches the secure tags such that a correct answer was provided. For example, the authentication system 330 may determine whether the provided answer sufficiently identifies the person in the provided voice profile. For instance, if the answer is "father" and the secure tag indicates that the person in the voice profile is the individual's father, then this may be considered correct. In another example, if the answer is a person's name that does not match the stored person's name, the answer may be considered incorrect.

In step 830, if the answer is determined to match, the verification device 110 may return the answer (e.g., to the entity device 130) as being verified or correct. In step 840, if the answer is determined not to match, the verification device 110 may return the answer (e.g., to the entity device 130) as being not verified or incorrect.

In step 850, the verification device 110 determines whether to continue with another voice profile test with another voice profile. In some instances, a security level may require multiple correct answers associated with voice profiles across different groupings of linkages. In another example, an incorrect answer may be given a chance to be corrected by providing the same or a different voice profile for authentication. If the testing is to be repeated/continued, the process returns to step 430 for recalling a voice profile. If the testing is complete, the process moves to step 860.

In step 860, an authentication decision is determined by the verification device 110. For example, the authentication system 330 may determine whether the individual provided sufficient correct answers to establish that the person's identity is verified. Alternatively, the authentication system 330 may decide that the person's identity is not verified on the basis of incorrect answers provided during the testing.

The present description and claims may make use of the terms "a," "at least one of," and "one or more of," with regard to particular features and elements of the illustrative embodiments. It should be appreciated that these terms and phrases are intended to state that there is at least one of the particular features or elements present in the particular illustrative embodiment, but that more than one can also be present. That is, these terms/phrases are not intended to limit the description or claims to a single feature/element being present or require that a plurality of such features/elements be present. On the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description, that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for verifying the identity of a person through a verification device comprising a processing device and a memory comprising instructions which are executed by the processor, the method comprising:
  receiving identifying information related to the identity of the person;
  recalling a voice profile from a voice profile database having a plurality of user profiles and associated voice profiles, wherein linkages exist between the plurality of user profiles based on relationships between the people associated with the user profiles, and wherein the linkages are grouped into a plurality of groupings based on a type of relationship between the people associated with a user profile, wherein the plurality of groupings are based on ease of identification, and wherein the plurality of groupings comprise at least one grouping that is easier to identify and at least one grouping that is harder to identify, the voice profile being an audio recording of another person, wherein recalling the voice profile comprises:
    selecting a grouping from which to recall the voice profile, wherein the selection of the grouping is based on pre-established security settings that comprise requirements dependent on a desired level of security for the verification, and
    selecting a stored voice profile based on a linkage to a user profile associated with the person and the selected grouping;
  providing the voice profile to an end-user device;
  prompting the person to provide an identifying answer;
  receiving an identifying answer from the end-user device in response to the prompting the person to provide an identifying answer, the identifying answer being an attempt by the person to identify the identity of the another person based on the voice profile provided; and
  determining whether the identity of the person is verified based on the identifying answer from the end-user device.

2. The method of claim 1, wherein selecting a stored voice profile comprises selecting an active linkage.

3. The method of claim 1, wherein the identifying answer includes the relationship between the person and the another person.

4. The method of claim 1, wherein the identifying answer includes the name of the another person.

5. The method of claim 1, wherein the end-user device includes a speaker for playing the audio recording.

6. The method of claim 1, wherein determining whether the identity of the person is verified includes comparing the identifying answer to stored information and determining whether the identifying answer correctly identifies the another person from the voice profile.

7. The method of claim 6, further comprising providing an authentication decision to the end-user device based on the determination of whether the identifying answer correctly identifies the another person from the voice profile.

8. The method of claim 1, further comprising populating the voice profile database with a plurality of user profiles and associated voice profiles.

9. The method of claim 8, wherein populating the voice profile database comprises receiving a voice profile, associating a user profile with the voice profile, and creating linkages between user profiles based on relationships between the people associated with the user profiles.

10. The method of claim 9, further comprising grouping linkages based on a type of relationship between the people associated with the user profile.

11. The method of claim 1, wherein recalling the voice profile comprises selecting a plurality of voice profiles, one from each of a plurality of groups, wherein the groups are selected from family, friends, colleagues, acquaintances, and pets.

12. A verification device for verifying the identity of a person, comprising:
  a collection system configured to populate a voice profile database with a plurality of voice profiles associated with individuals known to the person, the voice profiles being audio recordings of the voices of the individuals known to the person;
  the voice profile database having a plurality of user profiles and associated voice profiles, wherein linkages exist between the plurality of user profiles based on relationships between the people associated with the plurality of user profiles, and wherein the linkages are grouped into a plurality of groupings based on a type of relationship between the people associated with a user profile, wherein the plurality of groupings are based on ease of identification, and wherein the plurality of groupings comprise at least one grouping that is easier to identify and at least one grouping that is harder to identify;

a testing system configured to:
  select one of the voice profiles from the voice profile database based on a linkage to a user profile associated with the person and a selected grouping, wherein the selected grouping is selected based on pre-established security settings that comprise requirements dependent on a desired level of security for the verification;
  provide the voice profile to an end-user device;
  prompt the person to provide an identifying answer;
  receive an identifying answer from the end-user device in response to the prompt the person to provide an identifying answer, the identifying answer being an attempt by the person to identify an individual associated with the voice profile; and
an authentication system configured to determine whether the identity of the person is verified based on the identifying answer from the end-user device.

13. The verification device of claim 12, wherein providing the voice profile to the end-user device comprises providing a prompt describing the form of the answer.

14. The verification device of claim 13, wherein the prompt comprises a plurality of answer choices.

15. A computer program product for verifying a person's identity, the computer program product comprising a computer readable storage medium having program instructions embodied therewith, the program instructions executable by a processor to cause the processor to:
  populate a voice profile database with a plurality of user profiles and associated voice profiles, the voice profiles being audio recordings of the people associated with the user profiles;
  receive identifying information related to the identity of the person having a plurality of user profiles and associated voice profiles, wherein linkages exist between the plurality of user profiles based on relationships between the people associated with the plurality user profiles, and wherein the linkages are grouped into a plurality of groupings based on a type of relationship between the people associated with a user profile, wherein the plurality of groupings are based on ease of identification, and wherein the plurality of groupings comprise at least one grouping that is easier to identify and at least one grouping that is harder to identify, wherein recalling a voice profile comprises:
    selecting a grouping from which to recall a voice profile, wherein the selection of the grouping is based on pre-established security settings that comprise requirements dependent on a desired level of security for the verification, and
    selecting a stored voice profile based on a linkage to a user profile associated with the person and the selected grouping;
  recall a voice profile from a voice profile database;
  provide the voice profile and a prompt to provide an identifying answer to an end-user device;
  receive an identifying answer from the end-user device made in response to the prompt to provide an identifying answer, based on the voice profile provided; and
  determine whether the identity of the person is verified based on the identifying answer from the end-user device.

16. The method of claim 1, wherein the groupings comprise one or more of family members, friends, colleagues, service personnel, or pets.

17. The method of claim 1, the method further comprising:
  repeating the method according to pre-established security settings, wherein the pre-established security settings require the method be repeated at least two times;
  wherein the determination whether the identify is verified further comprises verifying that each identifying answer received is correct.

18. The method of claim 17, wherein the pre-established security settings require that the voice profile be recalled from the same grouping each time the method is repeated.

19. The method of claim 17, wherein the pre-established security settings require that the voice profile be recalled from a progressively harder to identify grouping each time the method is repeated.

20. The method of claim 1, the method further comprising:
  determining that the identity of the person is not verified; and
  repeating the method.

* * * * *